(12) United States Patent
Klann

(10) Patent No.: US 6,364,040 B1
(45) Date of Patent: Apr. 2, 2002

(54) WALKING DEVICE

(76) Inventor: Joseph C. Klann, 68010 US Hwy. 71, Morton, MN (US) 56270

( * ) Notice: Subject to any disclaimer, the term of this patent is extended or adjusted under 35 U.S.C. 154(b) by 0 days.

(21) Appl. No.: 09/904,925

(22) Filed: Jul. 13, 2001

Related U.S. Application Data

(62) Division of application No. 09/245,804, filed on Feb. 5, 1999, now Pat. No. 6,260,862.
(60) Provisional application No. 60/074,425, filed on Feb. 11, 1998.

(51) Int. Cl.$^7$ .............................................. B62D 57/02
(52) U.S. Cl. ........................ 180/8.1; 180/8.6; 280/28.5
(58) Field of Search ........................... 180/8.1, 8.2, 8.3, 180/8.4, 8.5, 8.6, 8.7; 280/28.5; 446/353, 355, 356; 901/1

(56) References Cited

U.S. PATENT DOCUMENTS

| | | | |
|---|---|---|---|
| 61,416 A | * 1/1867 | Goodwin | 446/356 |
| 1,567,684 A | * 12/1925 | Srakula | 180/8.3 |
| 1,691,233 A | * 11/1928 | Ehrlich | 180/8.3 |
| 2,491,064 A | * 12/1949 | Urschel | 180/8.6 |
| 2,941,481 A | * 6/1960 | Philbrick | 180/8.4 |
| 4,527,650 A | * 7/1985 | Bartholet | 180/8.6 |
| 5,758,734 A | * 6/1998 | Hong et al. | 180/8.1 |

* cited by examiner

Primary Examiner—Lanna Mai
Assistant Examiner—Ruth Ilan
(74) Attorney, Agent, or Firm—M. Paul Hendrickson

(57) ABSTRACT

The present invention provides a walking device adapted to simulate a gait of a legged animal. The walking device includes a frame, a leg, an upper and lower rocking arms, a connecting rod and a crank all of which are axially interconnected together. The rocker arms and crank are axially mounted to the frame in a triangular spatial relationship. The cranking link is axially mounted to the frame in cooperative association with a suitable power source and operatively linked to a connecting rod which serves to transmit power from the crank to the interconnected linkages of the walking device. The leg has a hip joint at one leg end axially connected to the upper rocker arm, a foot attached to an opposite leg end and a knee joint axially connected to the connecting rod which is axially connected at an opposite connection rod end to a crank rod of the crank. The lower rocker arm at an end opposite from its axial frame mount is axially connected to a centrally disposed elbow linkage of the connecting rod. As power is supplied to the crank, the connecting rod reciprocates back and forth causing the foot of the leg to simulate an animal's walking gait. Multiple legged devices may be constructed by connecting a series (usually in pairs) of single legged units together. The device, through the proper location of various components, is able to simulate the gait of a legged animal in that the foot will travel along a substantially linear path until the device achieves a lifting position whereupon the leg is lifted and returned to a forward step similar to that of the legged animal. The walking device may be manually powered or motorized by applying motorized power to the crank axles.

5 Claims, 12 Drawing Sheets

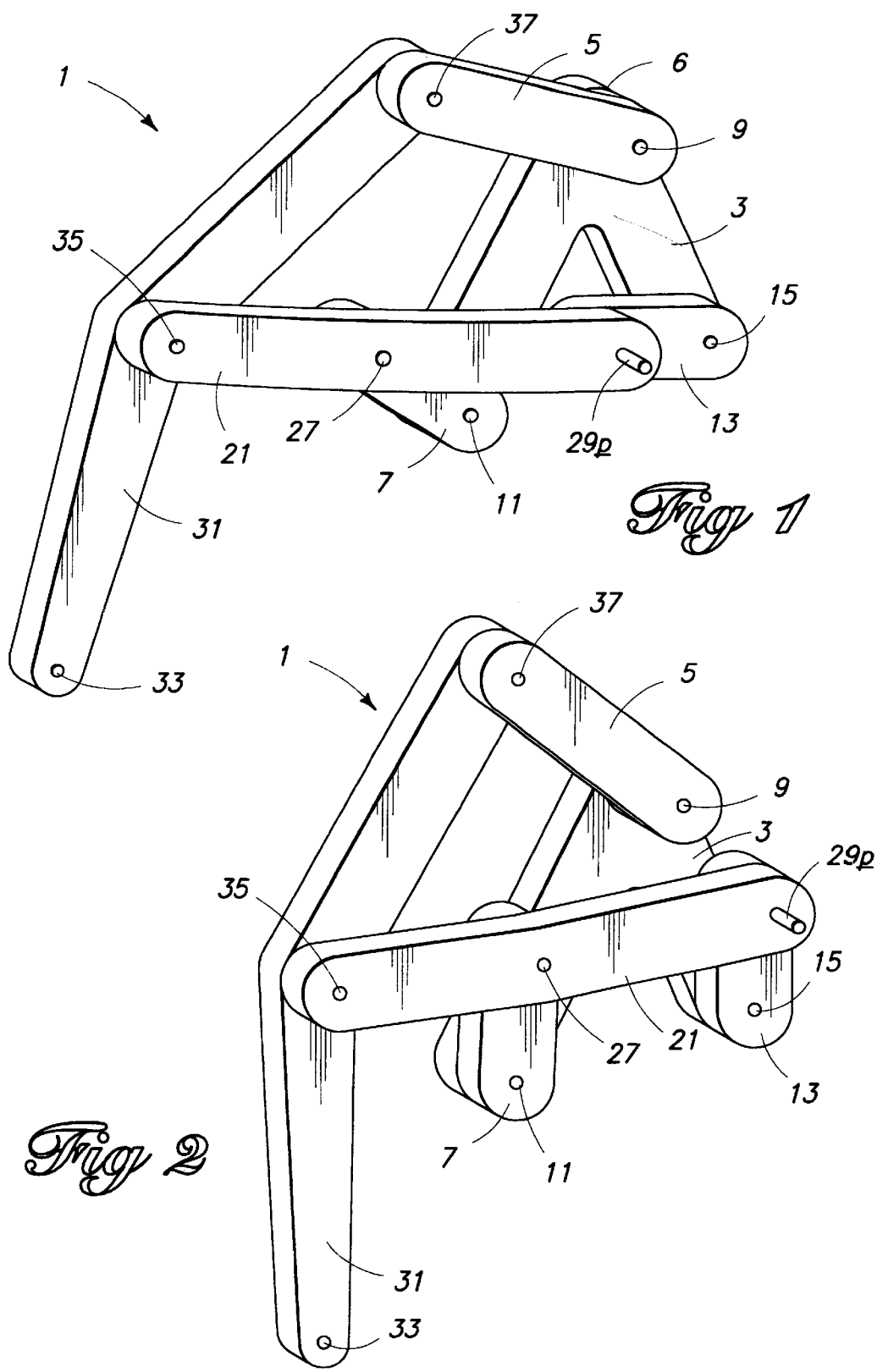

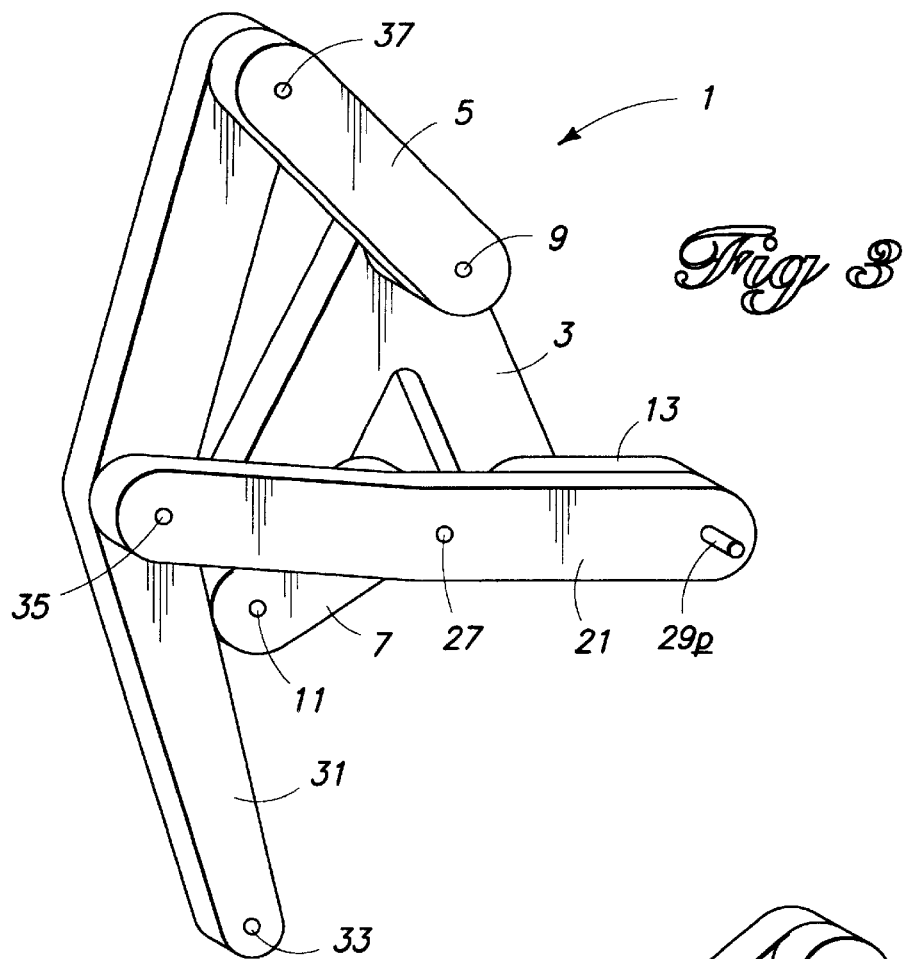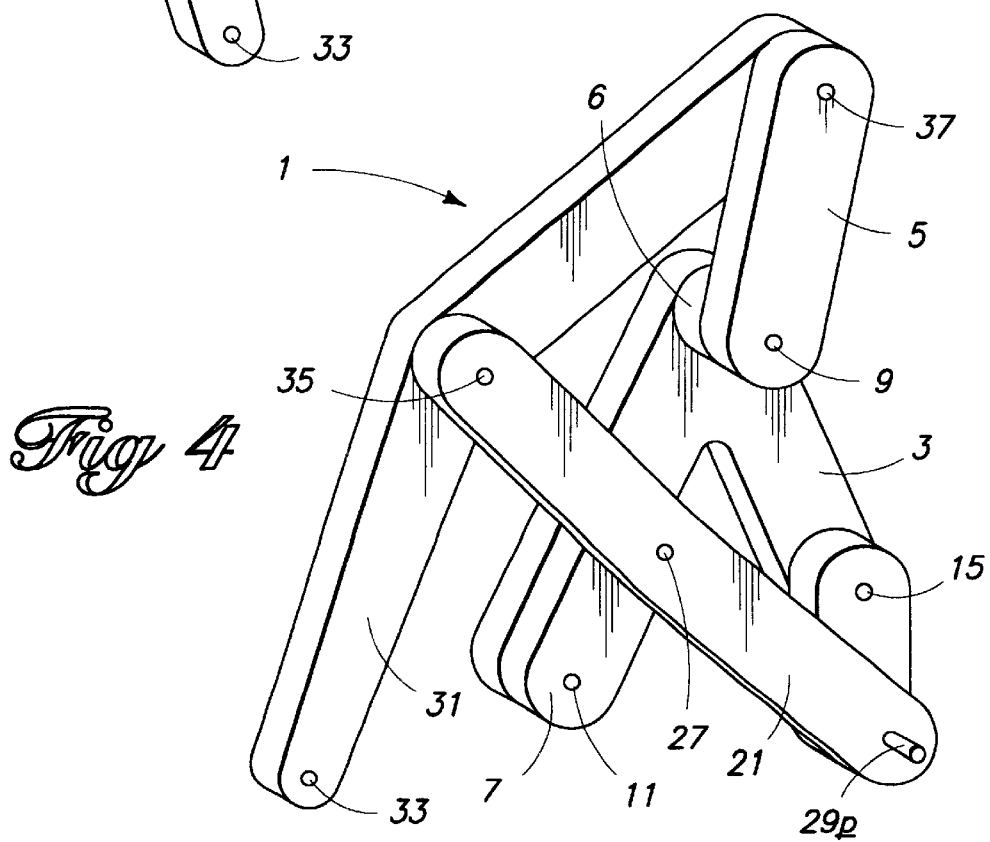

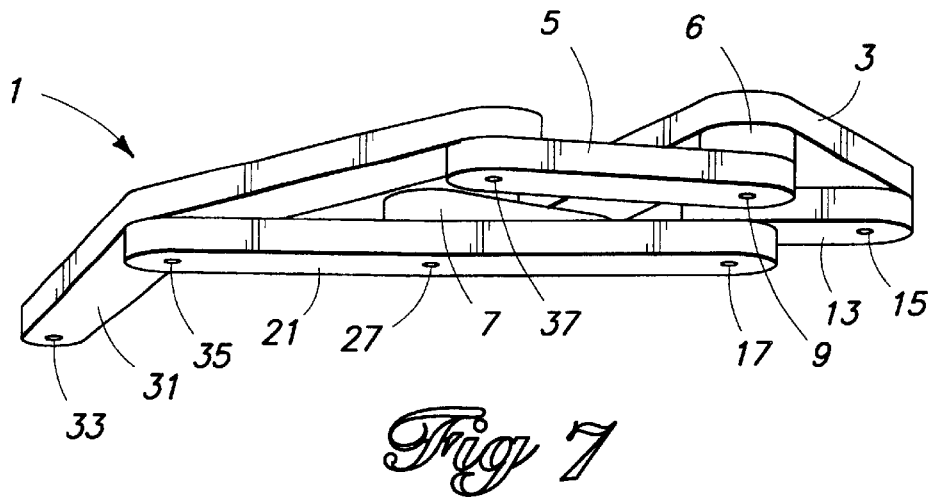
Fig 7
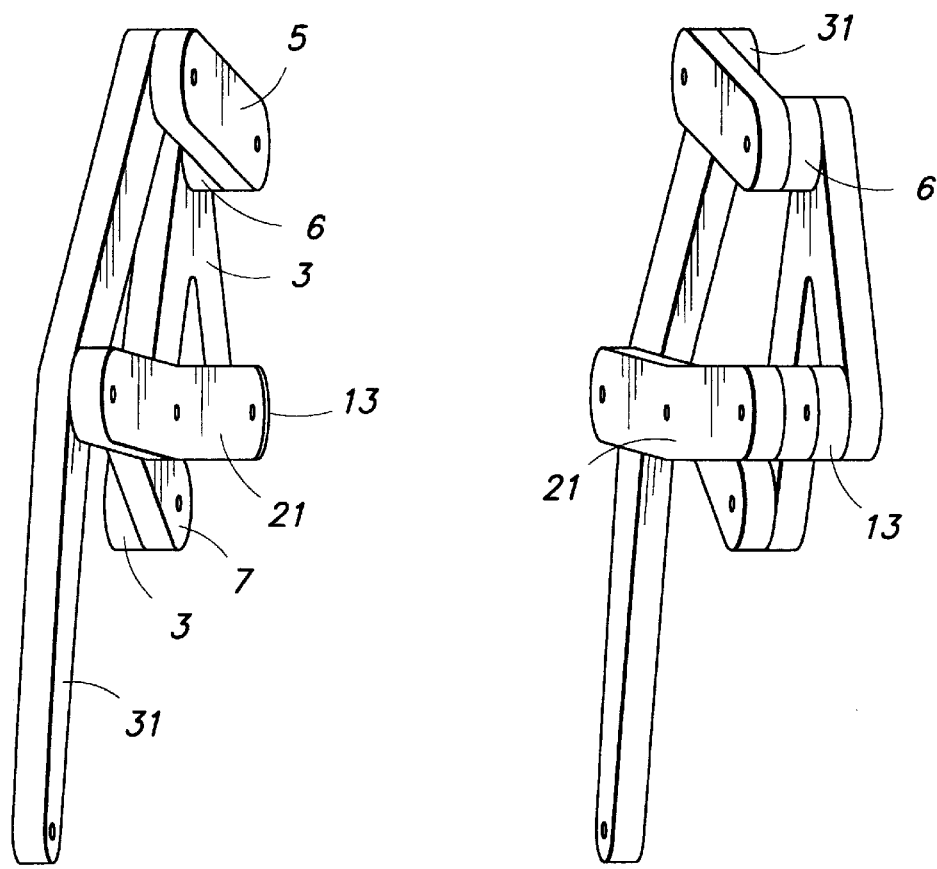
Fig 8
Fig 9

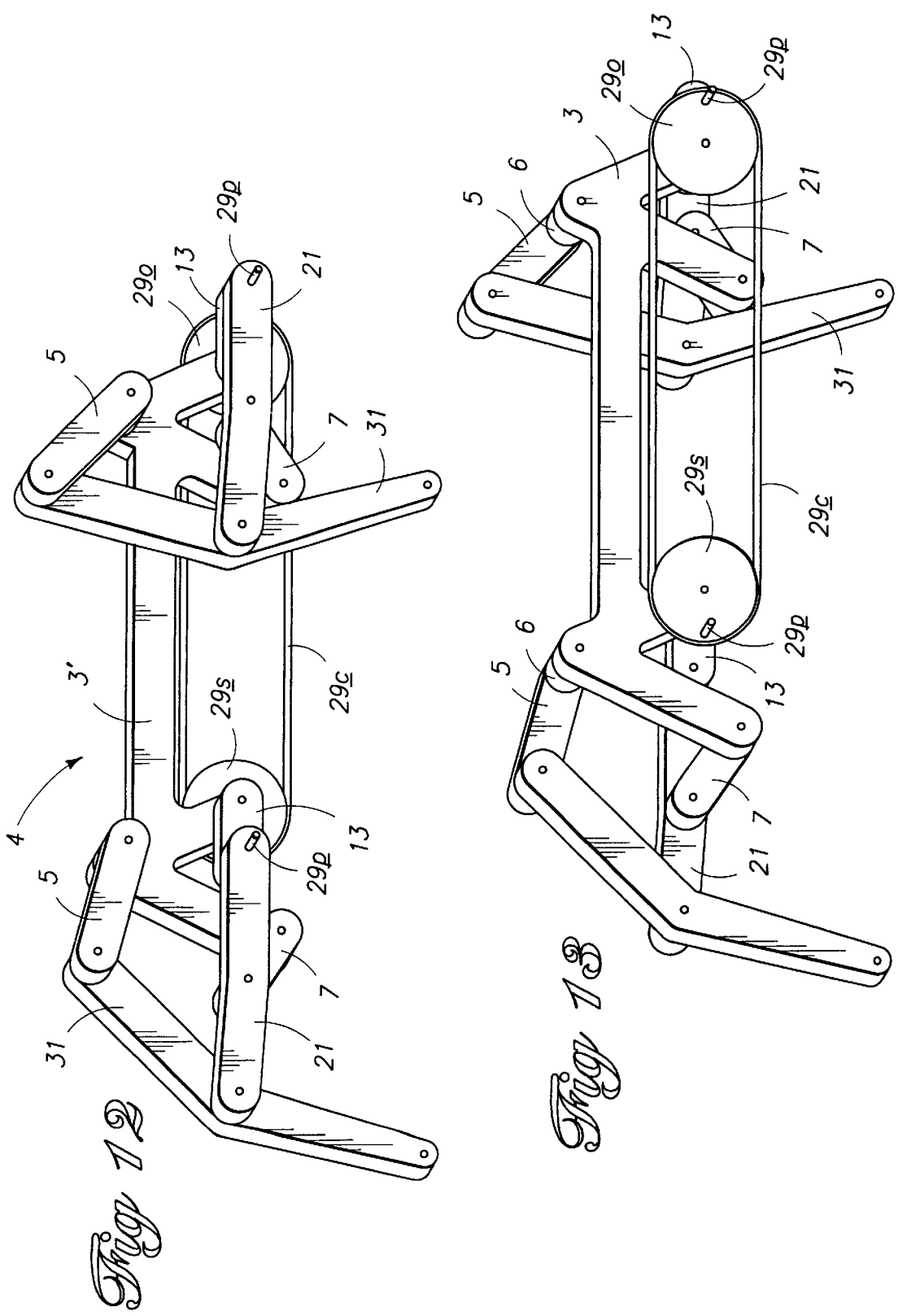

WALKING DEVICE

This application claims the benefit of provisional application No. 60/074,425 filed Feb. 11, 1998. This application is a divisional application of U.S. patent application Ser. No. 09/245,804, filed on Feb. 5, 1999 now U.S. Pat. No. 6,260,862.

FIELD OF THE INVENTION

The present invention relates to a walking device and its use and more particularly to a walking device which simulates a walking or running gait of a legged animal.

BACKGROUND OF THE INVENTION

It is difficult and often impossible to traverse certain surfaces with wheeled devices. Certain surfaces, such as slippery, sandy, iced, muddy, snowed, etc. surfaces, often result in complete immobilization of the wheeled device. Other difficult to traverse surfaces, such as stepped, obstructed, uneven, etc. surfaces, frequently create insurmountable barriers for wheeled devices. It would be desirable to provide a walking device which would simulate the walking gait of an animal so as to overcome these shortcomings of wheeled devices.

SUMMARY OF THE INVENTION

The present invention provides a walking device which simulates a walking step or gait of an animal. The device comprises pivotal linking sites and linkages which actuate a walking gait. The walking device includes a frame which supports a walking assembly composed of a cooperative arrangement of linkages axially connected together so as to provide a walking assembly which simulates the walking gait of an animal. The linkages are appropriately linked together by axial linking means for axially connecting the linkages together and to the frame. The linkages include a pair of rocker arms (upper and lower) axially mounted to a frame, a connecting arm or rod, a reciprocating leg and a cranking link. The pair of rocker arms includes a first rocker arm (upper) and a second rocker arm (lower) respectively axially anchored at one of their respective rocker arm ends to the frame and to different linkages at an opposite rocker arm end. The cranking link is also axially mounted to the frame in operative association with a power source and operatively linked to at least one connecting rod so as to provide locomotion to the interconnected linkages of the walking assembly. The walking assembly includes a reciprocating leg equipped at one leg end with a foot and a hip joint at an opposite leg end. The hip joint is axially coupled to an opposite rocker arm end from the axial mount of one rocker arm end to the frame. The first rocker arm limits locomotion of the hip joint about an acute arcual path as the first rocker arm and upper extremity of the leg reciprocates about the path when placed under locomotion by the power source.

A connecting rod powered by the cranking link connected to a suitable power source at a power end of the connecting rod and axially connected at a drive end of the rod to a knee joint centrally disposed between the hip joint and foot of the leg serves as a drive train for transferring the revolutionary motion of the cranking link to a reciprocating motion for powering the leg. The connecting rod includes an elbow joint connecting site axially linked to the second rocker arm which, similar to the first rocker arm, is also axially anchored at an opposite rod end to the frame.

The second rocker arm serves to limit the reciprocating motion of the elbow joint of the reciprocating arm as well as the knee joint of the leg. In operation, the first rocker arm and the second rocker arm cooperatively serve to limit the gait to a reciprocating arcual motion.

The cranking link includes a crank shaft powered by a suitable power source and a crank pin operatively connected to the connecting rod. Locomotion to the walking assembly is generated by any suitable power source powering the crank which, in turn, drives connecting rod. The crank shaft powered by a manual or motorized power source supplies rotational motion to the crank pin which transfers the orbital motion to the reciprocating motion of the connecting rod. Each revolution of the crank pin simulates a complete step. Thus, for each revolution of the crank pin, the reciprocating connecting rod as well as the leg will complete one reciprocating cycle (i.e. a complete forward and a complete rearward reciprocating motion).

The pivotal joints linking the linkages (i.e. the leg, the rocker arm, the connecting rod and cranking linkage) together and to the frame may be comprised of any suitable connecting link at the linkages which permit the linkages to revolve about the connecting links, such as a rod, pin, spindle shaft, axle or any other orbital connecting means which permit the linkages to revolve about their respective connective joints or links. Three of the linkages, namely the two rocker arms and the crank, are connectively linked to the frame while the remaining linkages are interconnected together. The first and second rocker arms rotate about connective axle sites attached to the frame which serve to generally limit the reciprocating motion of the connecting rod and the leg to arcual path. The frame provides the supportive structure for the linkages while also permitting a plurality of legged assemblies to be mounted to a single frame.

The rocker arms serve to limit the legged motion to a reciprocating arcual movement by limiting the horizontal and vertical motion of the reciprocating leg. Thus, when power is supplied to the crank, the connecting rod rotates about the crank link (pin)causing the rod to move the leg upwardly and downwardly through an arcual path for 180° (similar to a foot lifting gait) followed by a substantially horizontal backward motion to the 360° position at which time the sequence again repeats itself. Multiple walking assemblies, each of which simulate a single leg of an animal, may be mounted to the frame so as to create a walking or running gait. In a walking device for simulating the walking gait of an animal, three or more legs may be effectively utilized to stabilize the device against tipping.

BRIEF DESCRIPTION OF THE DRAWINGS

FIG. 1 depicts a side elevational view of a single legged walking device of this invention, the leg depicted in the grounded, fully extended grounded stride position.

FIG. 2 depicts the walking device shown in FIG. 1 with the leg shown in an intermediate grounded stride position.

FIG. 3 shows a side elevational view of the device shown in FIG. 1 depicting the grounded leg at the end of the grounded gait position.

FIG. 4 is a side elevational view of the legged walking device shown in FIG. 1 with the leg being depicted in an elevated position.

FIG. 7 is a top elevational view of FIG. 1.

FIG. 8 is a side frontal view of FIG. 1.

FIG. 9 is a rear side elevational view of the device shown in FIG. 1.

FIG. 12 depicts a side elevational view of a double legged tandem walking device powered by a chain with synchronized legs being shown as connected in a tandem relationship to a common frame.

FIG. 13 is an opposite side elevational view of FIG. 12.

DETAILED DESCRIPTION OF THE INVENTION

Figure 5:
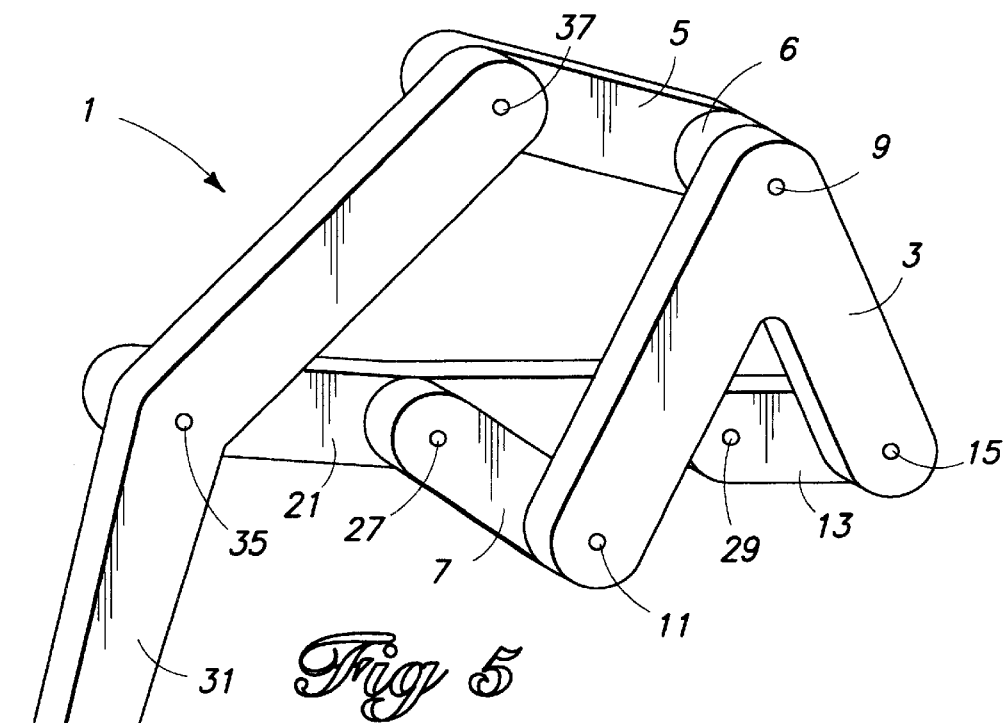
FIG. 5 depicts an opposite side elevational view of the device shown in FIG. 1.

With reference to FIGS. 1–19, there is provided a walking device (generally referenced by an enumeration 1 and suffixed for illustrative purposes) for simulating a walking step of an animal, said device 1 comprising a supportive frame (3), a reciprocating leg (generally referenced as 31) having a foot (referenced by 33) at one leg end, a hip joint 37 at an opposite leg end from said foot 33 and a centrally disposed knee joint (generally referenced by 35), a first rocker arm 5 axially connected at one rocker arm end to the hip joint 37 and axially anchored to the frame 3 by first rocker arm axle 9 at an opposite rocker arm end, a connecting rod 21 (also referred to as a connecting arm) equipped with a knee coupling mount 35c at a distal connecting rod end for operationally connecting connecting rod 21 to the knee joint 35, a crank connecting rod mount 17c at a proximate end of the connecting rod 21 and an elbow joint connecting site 27 laterally positioned between said knee coupling mount 35c and said crank connecting rod mount 17c, a second rocker arm 7 axially coupled to the elbow joint 27 at a first end of the second rocker arm 7 and axially mounted to frame 3 by a second rocker arm axle 11 at a second rocker arm end, and a crank 13 axially mounted to the frame 3 by crank shaft 15 which, in turn, is operatively connected to locomoting means (generally referenced as 29) for powering crank 13. A crank pin 17 of crank 13 is axially connected to connecting rod mount 17c at a distal connecting rod end or power input end of connecting rod 21.

Figure 10:
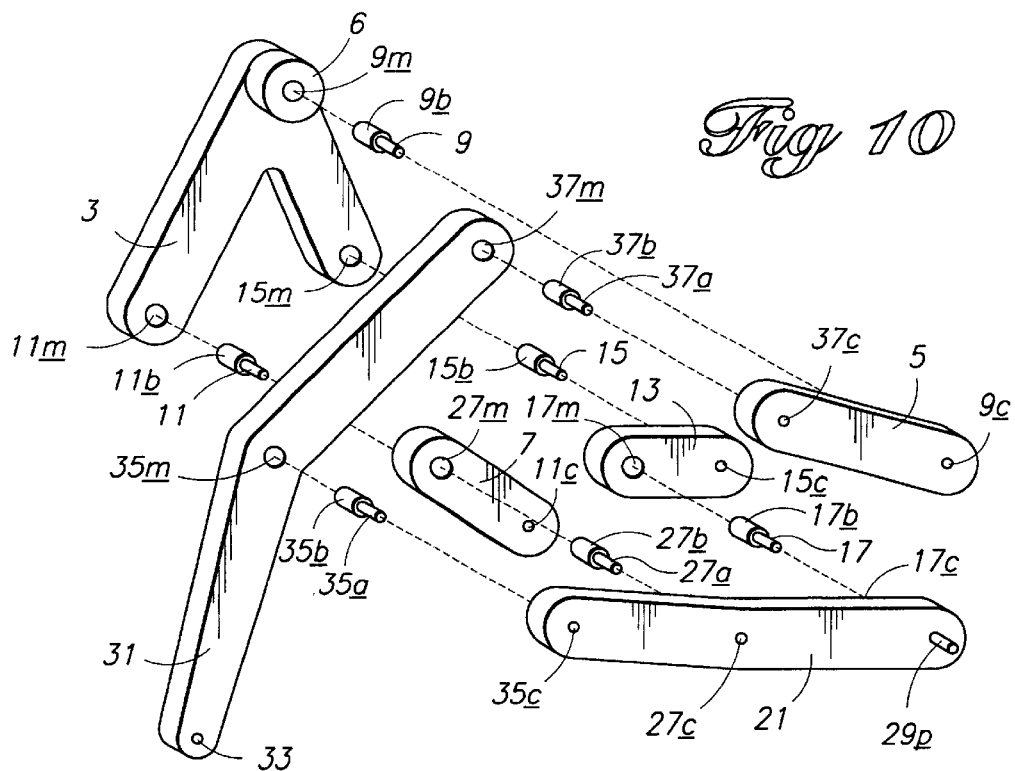
FIG. 10 is an exploded view of the components for the device shown above.

The walking device 1 may be perceived as comprising one or more basic structural units, the basic walking assembly 1 of which comprises a single legged device 1 (or as 1 suffixed by alphabetical letter for illustrative purposes) as depicted in FIGS. 1–10. By combining the basic walking assembly units together (e.g. 1A, 1B and 1C), multiple legged walking devices 4, 8, 8' and 10 as illustrated in FIGS. 11–16 and 18–19 may be created. The number of basic units linked together to form the desired walking device is unlimited. As may be observed from the basic walking unit 1 shown in FIGS. 1–10, the basic walking assembly 1 of the walking device 1 is equipped with two rocker arm linkages (5 and 7) each of which is axially mounted to frame 3 at axle mounts 9 and 11. Crank 13 is also axially mounted to the frame 3 by crank shaft or axle 15 which, in turn, is connected to a suitable power source (manual or powered) for powering crank pin or spindle 17 positioned in a laterally disposed relationship to the crank axle 15. The distance knee joint 35 travels will depend upon the distance traversed by connecting rod 21 which, in turn, depends upon the orbital path of crank pin or rod 17. Referring to FIG. 10, crank pin 17 is operatively connected to the connecting mount 17c of connecting rod 21 at a proximate connecting rod end or power end. Knee axle 35a is axially connected at a distal connecting rod end of connecting rod 21 to a knee joint 35. Second rocker arm 7 reciprocates about an acute angular arc vortexed at its axle mount 11 to frame 3, while the connecting rod 21 reciprocates in a backward and forward motion when the crank connecting mount 17c of the connecting rod 21 is drawn about an orbital path of crank pin 17 of crank 13.

The first rocker arm 5 is connected to frame 3 by first rocker arm axle 9 which, in turn, maintains hip joint 37 along an arcual path of an acute angular configuration causing the hip joint 37 to be withdrawn in an upwardly direction, and upon completion of the backward motion of leg 31 to be thrust in a downwardly and outwardly motion so that leg 31 thereby simulates a walking gait as the first rocker arm 5 reciprocates in its radial backward and forward motion. These gaited movements follow a sequential radial pattern which bear a corresponding registration onto the orbital position of the crank spindle 17 at any given time. For any given angular position of spindle 17, foot 33 will, accordingly, bear a constant registration along a curvilinear and linear pathway as formed by moving foot 33.

Movement of the various linkages about their respective axial connecting links may be observed by referring in particular to FIGS. 1–9. FIGS. 1 and 5 depict side elevational views of a single legged walking device 1 in which leg 31 is shown as being fully extended in the grounded position. It will be observed that crank 13 and connecting rod 21 both register in a fully extended positioning as is leg 31. If crank rod or crank spindle 17 is prescribed a 0° reading when the leg 31 is in the fully extended position as shown in FIGS. 1 and 5, then various other positions of the gait may also be referred by the radial positioning of crank rod 17. As previously mentioned, at any radial position of crank rod 17 the walking device 1 will exhibit a given configuration. Thus, the configuration of the various components of the walking assembly 1 will undergo cycled transformation in configuration as the crank rod 17 rotates about its orbital axis until the crank rod 17 completes its orbital 360° axis, at which time a repetitive sequence of cycling and configuration will then repeat itself. Thus, for any given radial position of crank spindle or rod 17, the walking assembly 1 will have a prescribed configuration and relationship between its component linkages.

Figure 6:
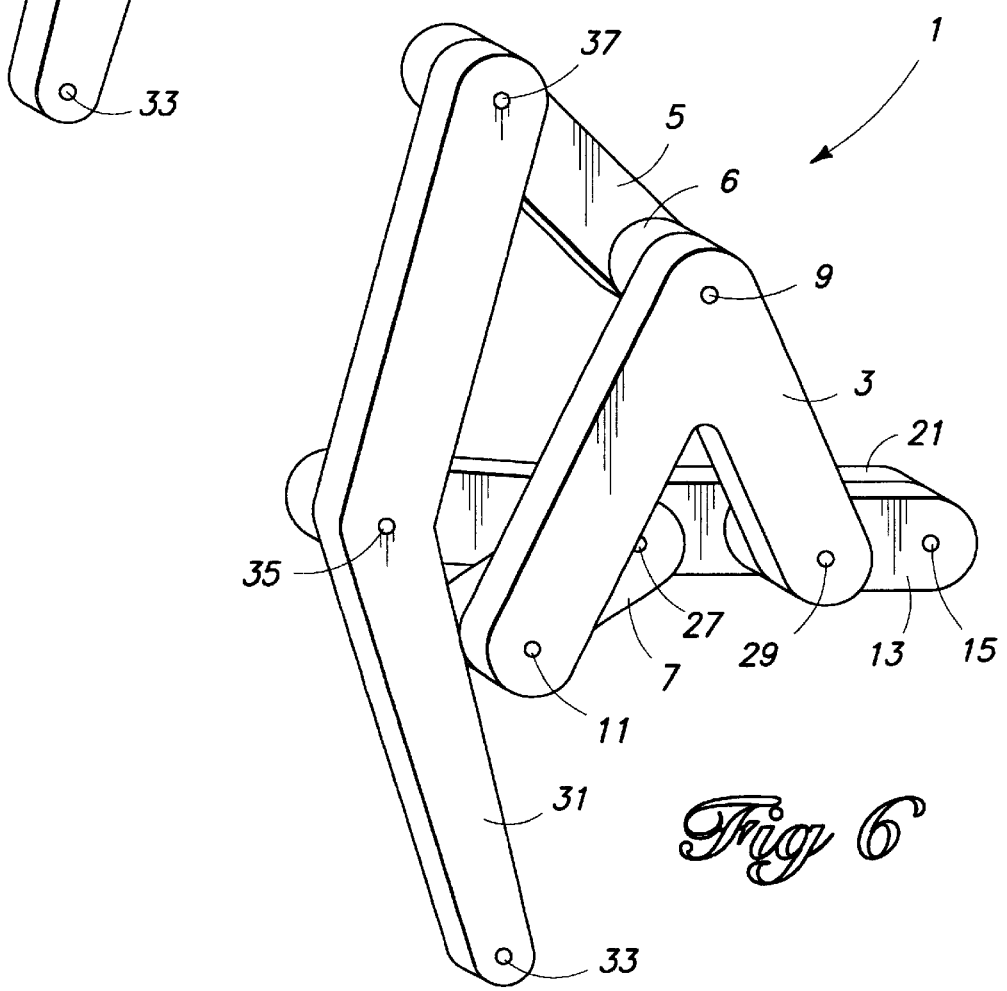
FIG. 6 is an opposite side elevated view of FIG. 3.

The various cycled steps of the walking device 1 as exemplified by a single legged device 1 may be viewed by referring to FIGS. 1–9. As may be seen in FIGS. 1 and 5, the leg is fully extended when crank spindle 17 is at 0°. In FIG. 2, crank rod 17 is shown as being rotated to a 90° radial position whereupon leg 31 and foot 33 moves to an intermediate grounded stride position. As crank rod 17 rotates to the 180° position (as shown in FIGS. 3 and 6), the grounded leg 31 is then shown at a completion of its grounded gait position. This would represent a leg 31 in its most rearward grounded position immediately before foot 33 is lifted from the ground by crank 13. As the crank rod 17 of crank 13 rotates clockwise from the 180° position, foot 33 is lifted from the surface by the arcual movement of leg 31 until rod 17 rotates past a 270° angular position, whereupon leg 31 and foot 33 express their most elevated lifted position (at about 285°) or orbital position. FIG. 5 depicts an opposite side view of the walking assembly 1 shown in FIG. 1 in which the crank rod 17 has returned to its original 0° position. Further rotation of the device will result in a repetitive recreation of the cyclic configurations of an orbital movement of the foot 33 as partially depicted by FIGS. 1–9. The manner in which the linkages control the gait is uniquely different from conventional means used to propel surface vehicles. When first implanting foot 33, the interconnected linkages allow foot 33 to follow a substantially linear movement until it reaches it most rearward position at which time the linkages lift the foot 33 so it may then traverse impeding objects such as steps. Meanwhile the frame 3 maintains a substantially parallel relationship to the surface throughout the walking cycle. The curvilinear, substantially linear orbital foot movement of foot 33 (as opposed to a circular orbitation) also allows the foot 33 to be implanted upon the surface for a sufficient distance to move the walking unit 1 forward or backwardly. Contact between the walking surface and the foot 33 in a substantially linear pathway is maintained for about half of the revolutionary time interval of crank 13.

The connecting rod 21 connected to leg at knee joint 35 serves as a driving means for propelling leg 31 in a reciprocating arcual motion. Upon a 180° degree revolution of crank spindle 7, the connecting rod 21 will effectuate a complete leg lifting forward movement while for about the remaining 180° revolution of the crank, the connecting rod 21 is drawn backwardly as it simulates the grounded gait of the leg 31 in a walking sequence. This sequential movement or cycling of leg 31 may be reversed or altered as may be observed by the multiple legged walking devices 1 of FIGS. 11–16 and 18–19. By reason of the connecting arm 21 being linked to second rocker arm 7, the vertical and horizontal motion of the connecting arm 21 and leg 31 is linked to a prescribed orbital motion which includes a substantially linear movement when the foot 33 is grounded. This limitation in motion creates a cooperative arrangement of pivotally linked linkages which simulate the gaited walk of a legged animal and uniquely create locomotion for the walking device 1.

Figure 17:
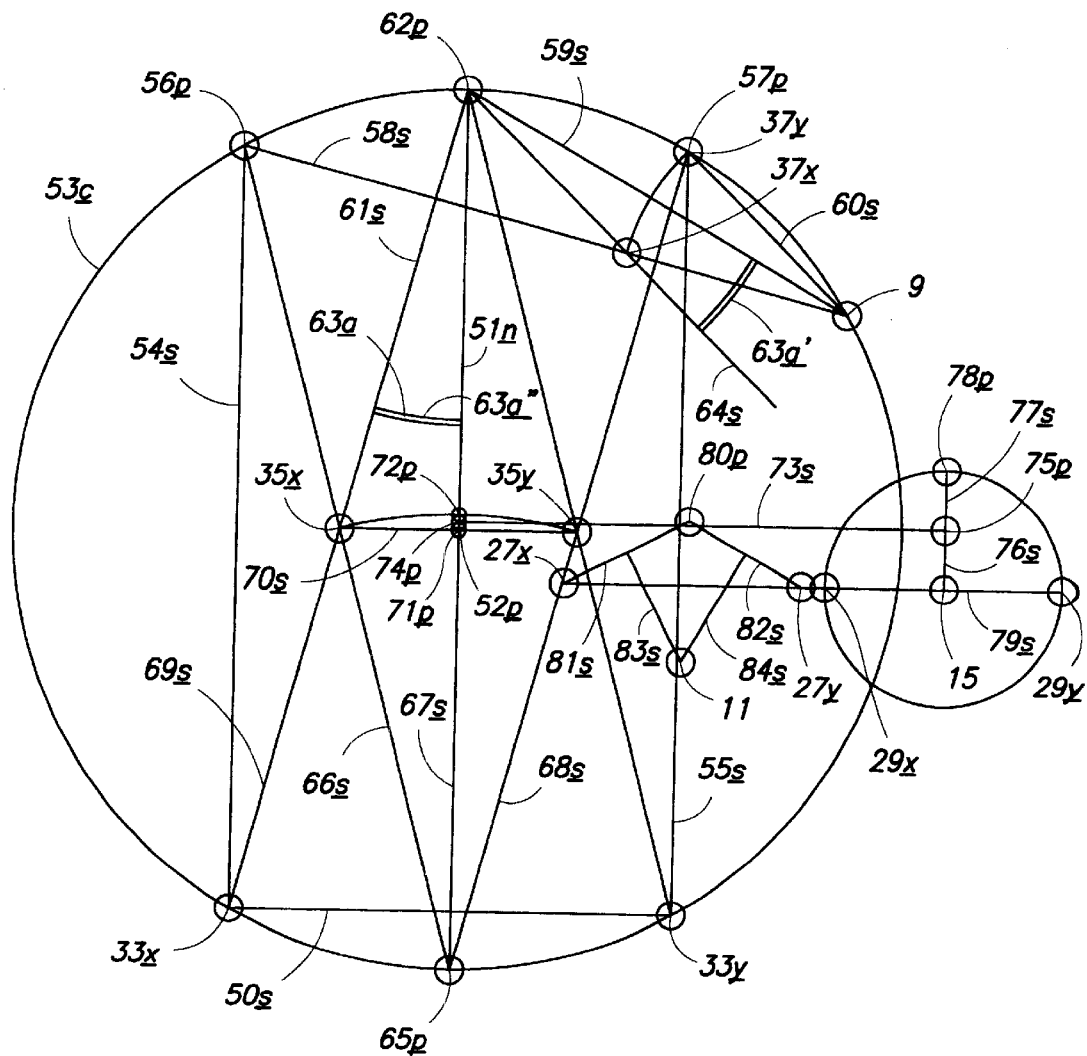
FIG. 17 illustrates a geometric representation for plotting and determining suitable axial coordinates for the walking devices.

The rocker arm axial connections (9 and 11) of the first rocker arm 5 and the second rocker arm 7 are geometrically positioned upon frame 3 so as to provide a walking device 1 generating a desired orbital pathway or stride for foot 33. The axial mounts 9m and 11m of the first and second rocker arms 5 and 7 are positioned at a prescribed interrelationship. Thus, when constructing the device 1 having a prescribed stride length and elevation, it is necessary for these axial mounts 9m and 11m to use coordinates which yield the desired stride. The rocker axle mounts 9m and 11m may be randomly chosen amongst an infinite number of possible coordinate sites, the choice of which primarily depends upon the desired gait. By configuring frame 3 in a triangular configuration, proper coordinate positioning for axle mounts 9m and 11m may be achieved while also providing a crank shaft mount 15m for crank shaft 15 at the remaining triangular coordinate of the triangular frame 3. Suitable axle mounting positions for axle mounts 9m and 11m, and crank mount 15m as well as the remaining coordinating positions for other walking components may be computed mathematically or geometrically as illustrated by FIG. 17 and its use to plot coordinating values and positions.

Planar alignment of the linkages for the basic walking assembly 1 may be observed by referring in particular to FIGS. 1–10. Leg 31, second rocker arm 7 and crank 13 are appropriately placed in vertical or planar alignment with one another while the first rocker arm 5 and the connecting rod 21 are placed in separate planar alignment with one another but in a parallel planar relationship to leg 31, rocker arm 7 and crank 13. A first rocker arm spacer 6 of a thickness comparable to the thickness of leg 31 facilitates placing the first rocker arm 5 in proper alignment with hip joint 37 and leg 31 so as to provide the proper clearance and operation of the reciprocating components. As may be observed by referring particularly to FIG. 6; leg 31, second rocker arm 7 and crank 13 thus rest in planar alignment with one another while the first rocker arm 5 and the connecting rod 21 are in a second vertical or planar alignment with one another. Appropriate alignment may also be achieved by other conventional techniques such as an off-set or bent leg to compensate for the alignment difference.

FIG. 10 depicts an exploded elevational view of the parts of the basic walking assembly 1 of FIGS. 1–9 and reveals preferred embodiments of walking assembly 1, some of which may be occluded from full view in FIGS. 1–9. As will be observed from FIG. 10, the appropriate link sites may be suitably provided with bushing or bearing mounts which serve to seat the bushing or bearing and axial components of the walking assembly 1. As may be further observed from FIG. 10, triangular frame 3 includes three bushing mounts, namely the second rocker arm bushing mount 11m, the first rocker arm bushing mount 9m and a crank axle bushing mount 15m. Second rocker arm bushing 11b seated onto second rocker arm bushing mount 11m within which second arm axle 11 is axially connected to second rocker arm axle connection site 11c serves to axially anchor the second rocker arm 7 to frame 3. Similarly, first anchor bushing 9b seated in first rocker arm bushing mount 9m of frame 3 within which first rocker arm axle 9 is journaled and connected to first rocker arm axle connecting link 9c of the first rocker 5 arm which collectively serve to axially anchor the first rocker arm 5 to frame 3. It should be further observed that the first rocker arm spacer 6 serves to provide the appropriate spatial relationship between leg 31 and first rocker arm 5.

Figure 11:
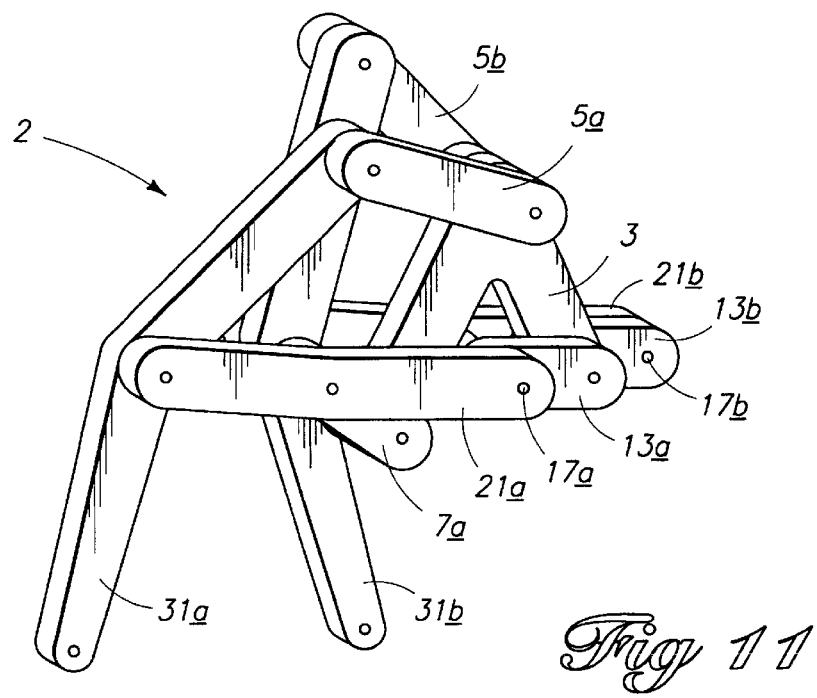
FIG. 11 depicts a side elevational view of a two legged walking device of this invention.
Figure 14:
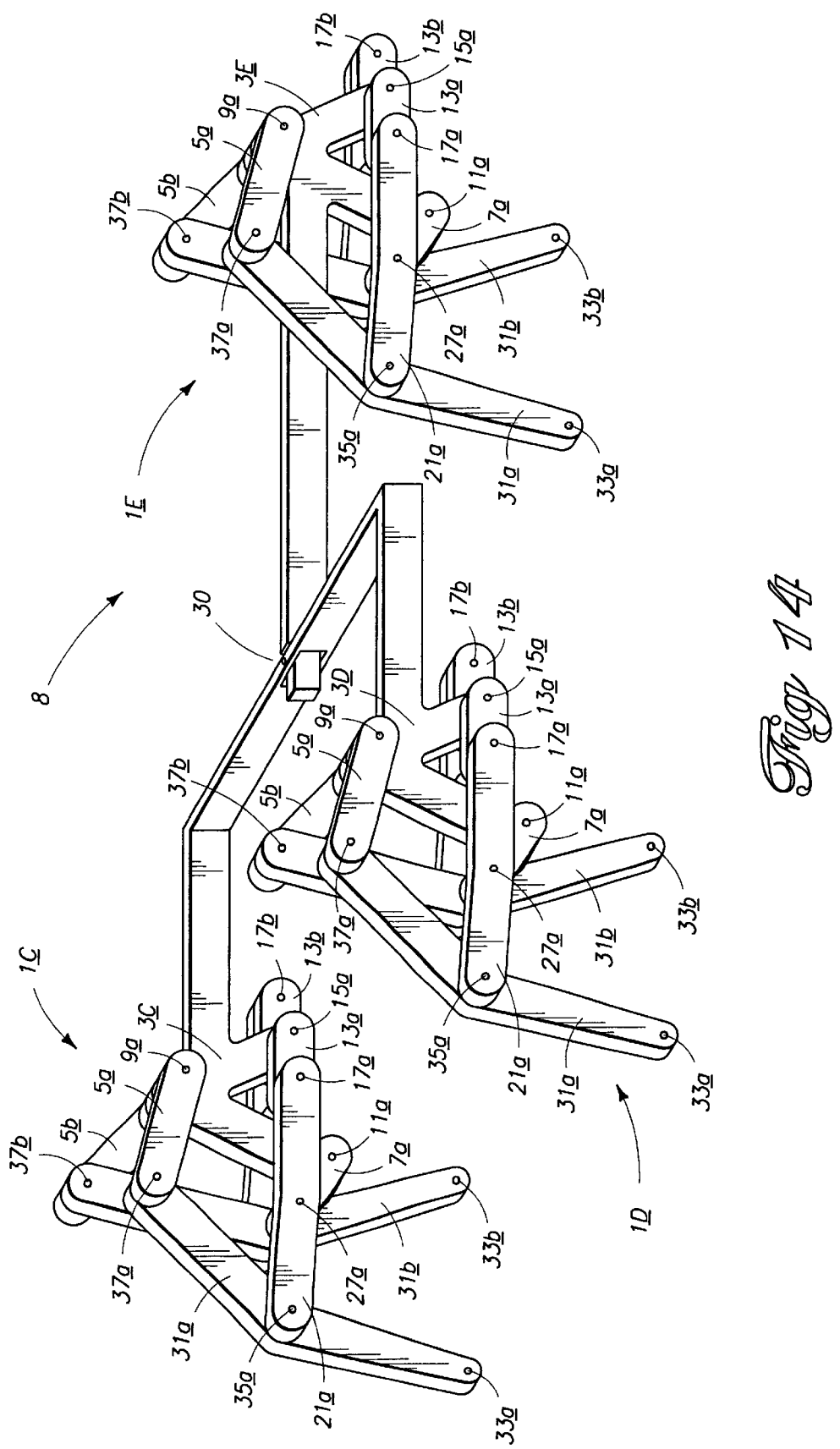
FIG. 14 is a side elevational view depicting a six legged walking device of this invention.

Similarly, to enhance pivotal movement, crank shaft bushing 15b is seated in crank axle bushing mount 15m of frame 3 within which crank shaft 15 is axially mounted and connected to crank axle connecting link 15c. Since the walking assembly or device 1, as depicted in FIGS. 1–10, includes only one leg, there is no necessity for the crank shaft 15 of the single legged walking device 1 to be interconnected to other cranks, (generally prefixed by number 13) and legs 31 as illustrated in FIGS. 11–16 and 18–19. If desired, the crank shaft 15 may be extended and connected with an additional or multiple crank shafts 15 on the opposite side of the frame 3 as shown in FIGS. 11, 14 . 15 and 18–19. Crank shaft 15 provides a suitable drive source for connecting a power source 29 to the walking device 1 for powering at least one or more crank linkages 13.

As illustrated by FIG. 10, hip joint 37 may appropriately include a hip joint bushing mount 37m for receiving hip axle bushing 37b and hip axle 37a connected to hip coupling mount 37c of the first rocker arm 5. In a similar fashion, knee joint 35 may appropriately include a knee joint bushing mount 35m of leg 31 for receiving knee bushing 35b and knee axle 35a which is seated to knee coupling mount 35c of connecting arm 21. A second rocker arm 7 is shown in FIG. 10 as including an elbow bushing mount 27m for seating elbow bushing 27b and elbow axle 27a which, in turn, is axially connected to elbow connecting site 27c. Similarly, crank 13 includes a crank rod bushing mount 17m for seating crank rod bushing 17b and crank rod 17 which is connected to crank connecting mount 17c (occluded from view) of connecting rod 21.

Figure 15:
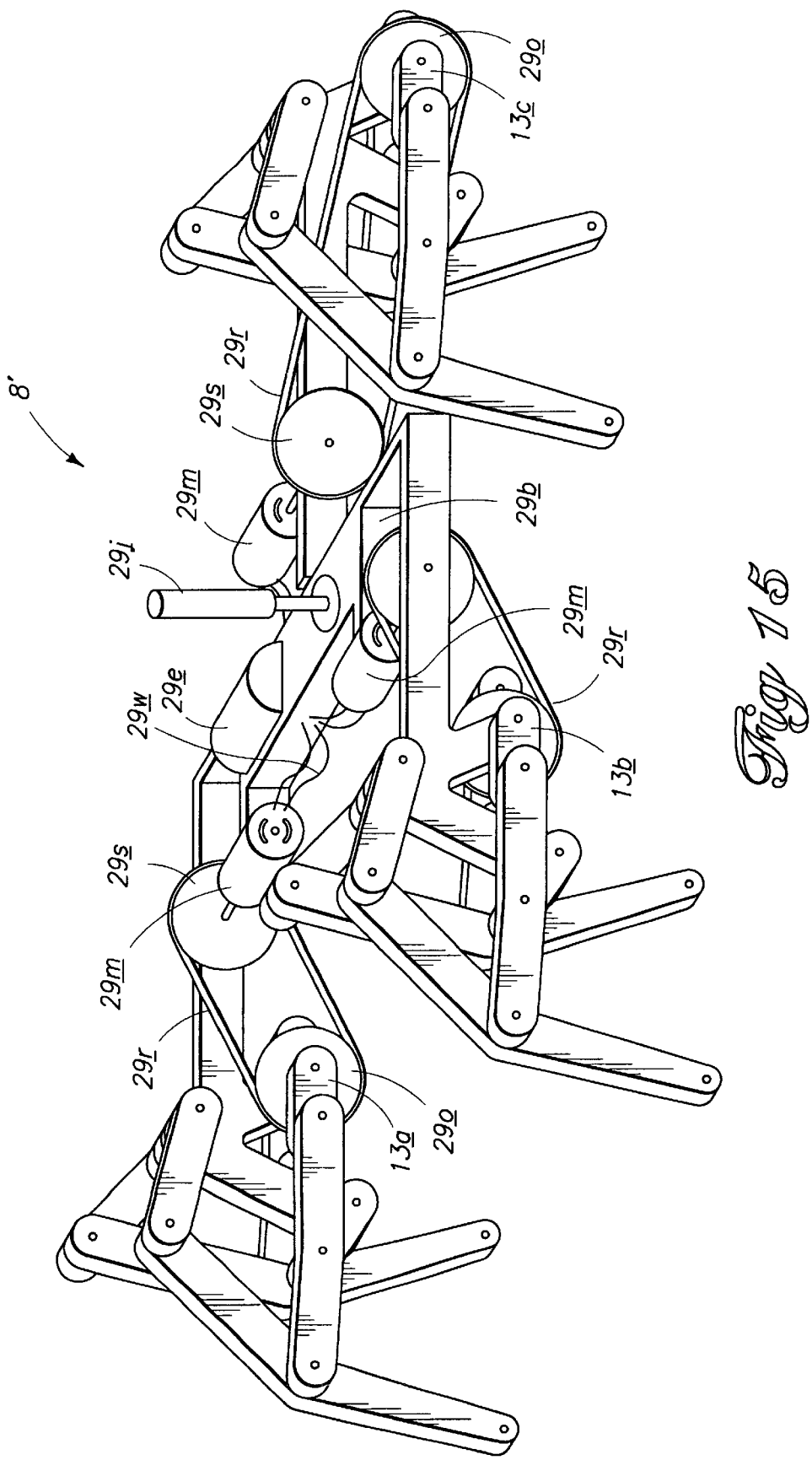
FIG. 15 depicts a motorized version of the walking device depicted in FIG. 14.
Figure 18:
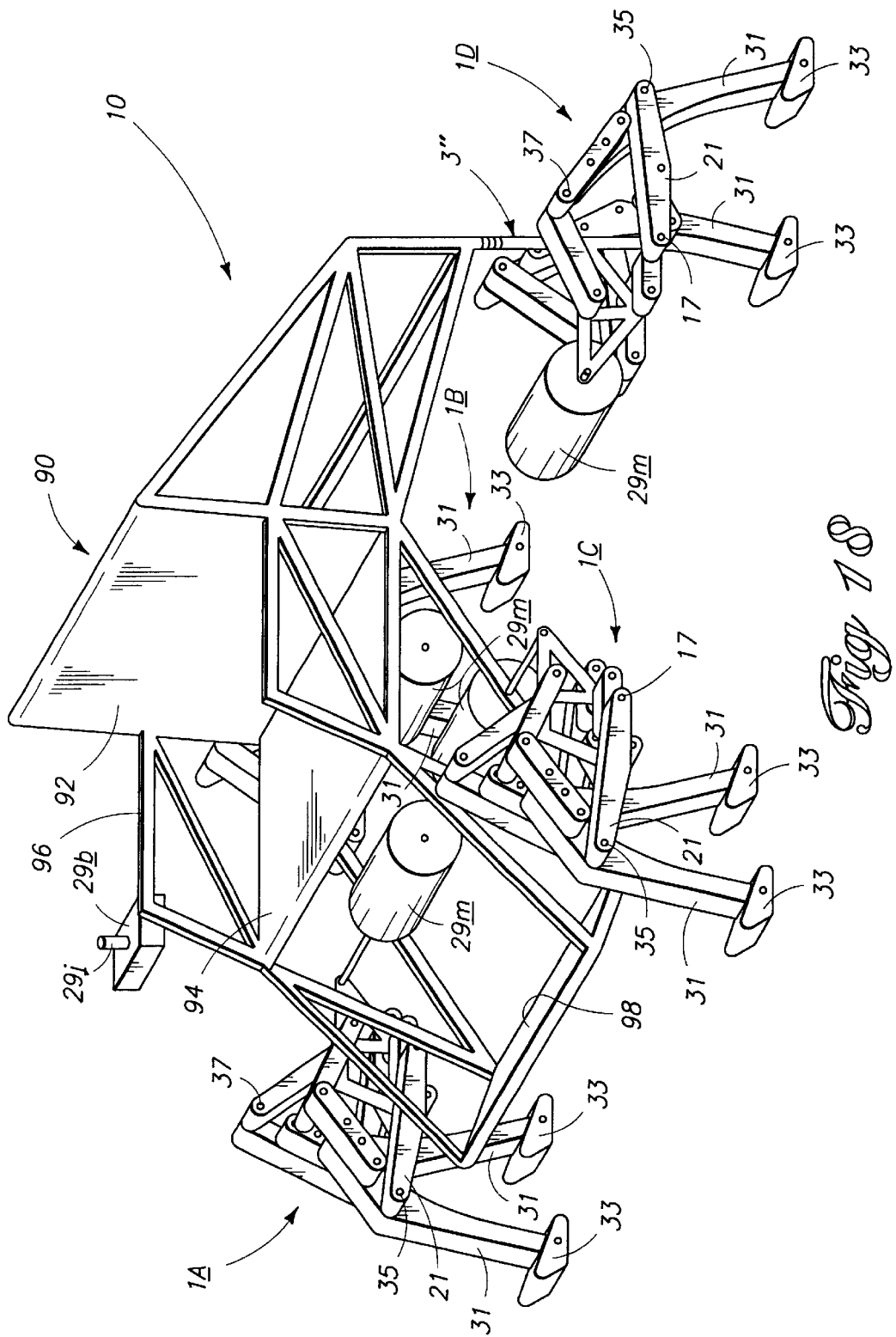
FIG. 18 is an elevational isometric view of a motorized wheelchair equipped with an eight-legged walking device of this invention.
Figure 19:
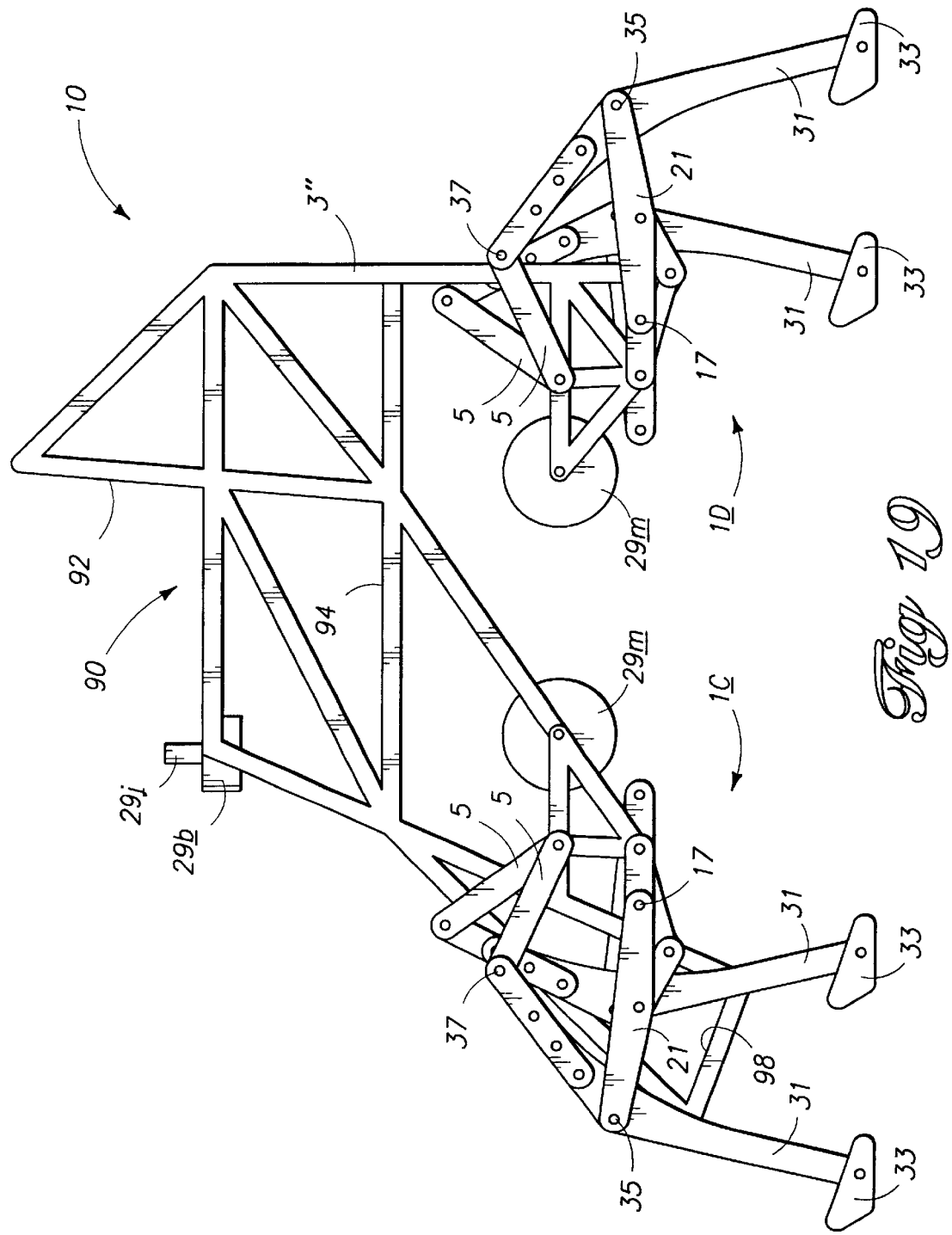
FIG. 19 is a side elevational view of the eight-legged device shown in FIG. 18.

In the drawings, FIGS. 1–13 are depicted as including a crank handle or pedal 29p. As may be observed from the manually powered walking assemblies 1 depicted in the drawings, crank rod 17 may be appropriately extended so as to provide a crank rod handle 29p as illustrated in FIGS. 1–11 or a foot pedal 29p as illustrated in FIGS. 12 and 13. In the motorized units, the power may be directly applied to crank shaft 15 by motor 29m to power the walking device 1 as shown in FIGS. 15 and 18–19. A single legged walking device 1 may be utilized to provide locomotion and traction to other movable objects such as a cart, sled, conveyor, spout, turnstile, gate, etc.

A series of basic walking assemblies 1 may be assembled together from the basic walking structure 1 of FIGS. 1–10 to provide various walking devices 4, 8, 8', and 10 simulating a walking gait of a multiple legged animal as illustrated by FIGS. 12–16 and 18–19. If desired, a series of tandemly positioned legs 31 in a fashion similar to those of a centipede may be secured to a common frame 3'. In the absence of a balancing system, the walking device 4, 8, 8' and 10 will advantageously include two or more walking assemblies (i.e. two or more legs) and preferably at least a three paired legged walking device 4, 8, 8' or 10 such as illustrated by FIGS. 14–15 and 18–19 with the legs 31 being positionally cycled so as to stabilize the device against tipping when powered to walk or run. When utilizing three legs 31, the motion of the legs 31 may be appropriately synchronized so that two of the legs 31 are simultaneously grounded while the third leg 31 is in the lifting forward moving gait cycle. By timing the reciprocating motion of the connecting rod 21 and connecting legs 31 at cycling 120° intervals, each of the legs 31 will be undertaking a sequential staging of an isometric gait.

Figure 16:
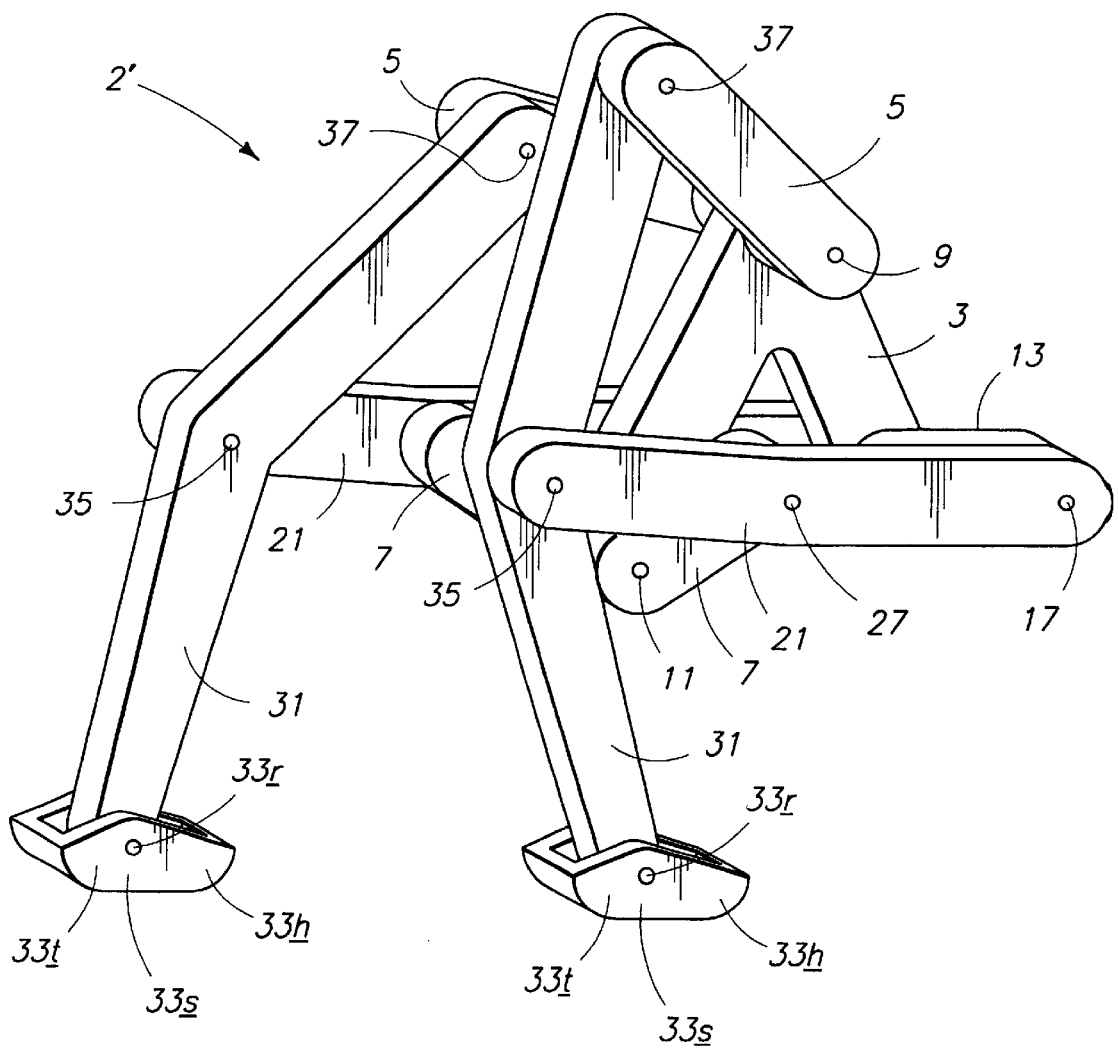
FIG. 16 depicts an opposite elevational side view of the device shown in FIG. 11 fitted with hinged shoes.

The staging or cycling of the gaited position of the legs 31 so as to simulate the walking gait of a human may be observed by referring in particular to FIGS. 11 and 16, which illustrate a walking device 2 or 2' equipped with two basic walking assemblies. This is accomplished by placing two basic walking assemblies, as depicted by FIGS. 1–10, in a side by side relationship upon a common triangular frame 3 as shown in FIGS. 11 and 16. When referring to multiple legged assemblies 2, the various component parts of the walking assembly bear the same enumeration as applied to the single legged device 1 except for an alphabetical suffixing thereto. In the multiple legged devices 2, duplicate components may, accordingly, be suffixed by capitalized or uncapitalized alphabetical indexing. Thus, in FIGS. 11 and 14, various linkages of the walking device 2 have been suffixed by an alphabetical subscript (a or b) so as to indicate whether a left- or right-handed component of the walking device 2 is depicted therein.

When the left leg 31a is in the most rearward position of FIG. 11, the right leg 31b is initially implanted onto the surface or the ground. This sequential coordination of the left leg 31a and the right leg 31b is achieved by connecting connecting rods (21a and 21b)to the crank spindles (17a and 17b) in a spatially phased 180° relationship to one another. Thus, when the right leg 31b is drawn to its most rearward position by connecting rod 21b and spindle 17b, the right connecting rod 21b will be at its most rearward position as will its relative position (180°) upon the spindle 17b. In contrast, left leg 31a will be thrust forward to its most forward grounded stride positioned with spindle 17a being positioned at the 0° position. Each leg (31a and 31b) will, accordingly, be appropriately positioned to provide the sequential positioning of the respective legs 31 in a normal walking mode.

The device may suitably include locomoting or drive means (generally referenced as 29) for powering the walking device. The locomoting means 29 may comprise manual drive means such as a crank handle, foot pedal 29p, etc. as illustrated in FIGS. 12 and 13 or by fitting crank pin 17 with an extended crank handle 29p as illustrated in FIGS. 1–11. The walking or running speed of device 1 will depend in part upon the rotational speed or r.p.m. of crank 13. Other independent factors bearing upon the operational speed relate to the stride length which may be altered by the length of leg 31, rocker arm linkage 5 and 7 length, positional placement of the mounting sites of rocker arms 5 and 7 upon the frame 3, reciprocating traversing distance of connecting rod 21 and the radius or distance between crank shaft 15 and crank rod 17. Similar to walking patterns, a reversal of the direction in which crank 13 rotates will effectuate a reversal in the direction of the stride. The crank 13, as depicted in the views of FIGS. 1–4, 11, 14–15 and 18–19, when rotating in a clockwise manner will produce a normal forward stride direction while a counterclockwise movement causes the legs 31 to move backwards.

In the tandem legged walking device 4 shown in FIGS. 12 and 13, walking 4 device may be powered manually or by motorized means operatively connected in place of the foot pedal 29p and operatively connected to the crank axle (occluded from view). If desired, power may be applied either manually or by means of a motor to either the front sprocket 29s or rear sprocket 29o. As may be observed from FIGS. 12 and 13 operational movement of pedal 29p will rotationally rotate sprocket 29s which, in turn, drives chain 29c to propel sprocket 29o Chain drive 29c serves to drive the rear legs 31 of the tandemly connected legs 31. As may further observed from FIGS. 12 and 13, the forward leg assembly and the rear assembly are phased at a 180° differential. The forward leg 31 is shown in the fully extended grounded position with rearward leg 31 being depicted in its rearward most grounded position. Further movement of chain 29c will result in the rearward leg 31 to be lifted off the ground while the forward leg 31 will continue its rearward movement along the surface until rod 17 rotates another 180°.

FIG. 14 depicts a manually operated walking device in which three of the walking assemblies 1 as disclosed in FIG. 11 have been integrated together (1C, 1D and 1E) to form a six legged walking device 8. As may be also observed in FIG. 14, the paired legs of each of the walking assemblies (1C, 1D and 1E) are timed so that the paired legs are at a 180° cycling differential as depicted in FIG. 11. The walking device, as depicted in FIG. 14, includes sufficient legged ground supports so as to maintain its stability when placed in motion. The two paired front assembly units 1C and 1D are positioned in a parallel and lateral alignment with one another, whereas the trailing unit 1E bisects the lateral placement of the two front units 1D and 1C. As will be observed from FIG. 14, the rear unit 1E is articulated to the front frame at articulating joint 30 so as to permit the rearward unit 1E to trailer and follow behind the forward units 1C and 1D. As will be explained in greater detail in reference to the motorized FIG. 15 version of FIG. 14, turning may be effectuated by moving the forward units 1C and 1D at different speeds while a constant speed applied to the two forward units 1D or 1E will generally result in a straight line movement of the walking assembly 8. Thus, if it is desired to turn right with the walking assembly 8 as depicted in FIGS. 14 and 15, the right paired legs 31 of 1D could accordingly be slowed down while the left paired legs 31 of 1C would be accelerated so as to effectuate a turning to the right. For turning to the left, the right paired legs 31 would, accordingly, move at a faster rate than the left paired legs 31 thereby allowing a turn to the left. By articulating the rear assembly 1E at joint 30, the rear assembly 1E simply follows the turning movement of the two forward assemblies 1C and 1D.

In an alternative embodiment of the invention as depicted in FIGS. 15 and 18–19, walking device 8' or 10 may be equipped with motors 29m connected to a suitable energy source (battery 29e) and control box 29b for powering walking device 8' or 10. Any motorized power source (electrical, spring, combustion, etc. engine) may be used to power or drive device. In the depicted motorized version of FIG. 15, three separate variable-speed, battery-operated, direct-current motors 29m are connected to a battery source 29e and regulated by a control box 29b so as to permit navigation of the device along a desired pathway. When all three variable speed motors 29m are operated at the same rotational speed, device will travel along a straight path When one pair of legs 31 of the forward units (1C or 1D) of the device is operated at a slower speed than those paired legs 31 on an opposite lateral side of the device, the device will turn towards the side with the slower operational pair of moving legs 31. Thus, by varying the speed of variable speed motors 29m, the device, shown in FIG. 15, can be turned right or left or allowed to go straight simply by varying the speed of motors 29m and the r.p.m. imparted to the respective crank 13 for the paired legs 31. In manually powered or driven devices, turning can, likewise, be effectuated by regulating the force and direction of force applied to pedals or crank handles 29p. In the depicted device 1 of FIG. 14, the rear walking assembly 1E is articulated at articulating joint 30 so as to permit articulation of the rearward assembly when turning. By articulation and trailering of the rear unit 1E, effective turning simply by varying the speed of the front driving assemblies 1C and 1D may be achieved.

With particular reference to the motorized walking device 8' as depicted in FIG. 15, each of the paired leg walking assemblies 1C, 1D and 1E are equipped with a battery operated variable speed motor 29m connected to control box 29b which, in turn, is powered by battery 29e. In FIG. 15, the variable speed motors 29m are operatively connected to drive sprockets 29s which transfer the rotational movement to drive belts 29r which, in turn, power sprockets 29o which are axially linked to the drive shafts (occluded from view) for turning crank shafts 15. Joystick 29j operatively associated with control box 29b allows the speeds of the motors to be varied by directional movement of joystick 29j. For example, a straight forward movement may be utilized to effectuate a straight movement joystick 29j whereas a slanted forward movement would effectuate a slowing of one motor in the direction in which joystick 29j is slanted while the opposite laterally disposed motor 29m would be operationally operating at a faster speed or r.p.m. so as to effectuate the turn. Instead of manually controlled joystick 29j, the device 1 may be remotely controlled (e.g. via radio) so as to allow an unmanned walking device 1 to traverse rugged terrain including terrains which are normally impassable or difficult to traverse with wheeled or tracked vehicles.

Other conventional means for turning wheeled vehicles may be effectively adapted to multiple legged vehicles of the present invention. For example, crank shafts, cranks, hydrostatic drive systems or drive sprockets may be individually fitted with braking systems so as to impede the speed of one or more walking assemblies 1 when a turn is being effectuated by the operator.

FIG. 16 is a side elevational view of the two legged walking assembly 1 of FIG. 11 fitted with axially or pivotally mounted shoes 35s. An off-set axle at mount 33r shoe 33s to foot 33 places the shoe 33s center of gravity towards shoe heel section 33h allowing the toe section 33t to gravitationally pivot upwardly when foot 33 and shoe 33s are lifted from the surface or ground. Spring actuated, hydraulic actuated, or other mechanical means for tipping the top section 33t upwardly may be used to place shoe 33s in the appropriate toe and heel position for walking or running. The faster foot movements may be facilitated by mechanical aides for expeditious positioning the toe and heel in the proper stride position. Similar to a human foot, shoe 33s increases base surface area coverage of the grounded foot 33 thereby stabilizing the walking assembly 1 against tipping. Increased surface area coverage importantly allows the walking device 1 to walk across soft, non-firm, uneven, displaceable, dispersible, etc. surfaces (e.g. mud, snow, sand, grass, etc.) which are most difficult to traverse with conventional wheeled devices. Other conventional means for stabilizing the walking device 1 against tipping (e.g. inertia systems, lowering center of gravity, weight shifting systems, gyroscopic means, stabilizing arms, etc.) may be utilized to stabilize the lesser legged walking assemblies 1 against tipping.

FIGS. 18 and 19 respectively depict an elevational isometric view and a side elevational view of a motorized walking chair (generally designated as 10) embodying the motorized and pivoting foot embodiments of the walking device 1 as depicted FIG. 15. The walking chair device 10 includes four paired leg walking assemblies (1A, 1B, 1C, 1D) powered by four battery-powered, variable-speed motors 29m operatively connected to control box 29b which, in turn, is powered by a suitable battery source (not shown). The walking chair device 10 is similar to a wheelchair except for the replacement of conventional wheels with the four walking assemblies 1A, 1B, 1C and 1D.

Similar to the walking device 8 as shown in FIG. 15, four variable speed motors 29m are used to separately power each of the walking assemblies 1A, 1B, 1C and 1D as shown in FIGS. 18–19. Conventional drive means, such as shaft, pinion, and spur gears, belts, chain drives, variable clutch systems, etc., may be appropriately utilized to transfer power to crank shaft 15. As mentioned before, movement of joystick 29j in cooperative combination with control box 29b allows the speeds of the motors to be varied by the directional movement of joystick 29j in a conventional manner.

The legs 31 of the walking chair device 10 are fitted with pivotally mounted feet 33 which enhance the traction and stability of the walking device 10. Similar to the construction of wheeled wheelchairs, the rear walking assemblies (1C and 1D) are pivotally mounted to frame 3", whereas the forward walking assemblies 1A and 1B are rigidly affixed to the bottom front base of frame 3. Similar to other depicted walking devices, the walking wheelchair device includes reciprocating legs 31 equipped with feet 33, a hip joint 37 opposite from the foot 33, a centrally disposed knee joint 35, a first rocker arm 5 axially connected at one end of the rocker arm 5 to the hip joint 37 and axially connected to frame 3" by a first rocker arm axle 9 at an opposite arm end, and a connecting rod 21 equipped with a knee coupling mount 35c (e.g., such as shown in FIG. 10) at the distal connecting rod end for operationally connecting rod 21 to knee joint 35.

Similar to the other walking devices 1 mentioned above, a crank connecting rod mount 17c (e.g., such as shown in FIG. 10) at the proximate end of the connecting rod and elbow joint connecting site 27 (e.g., such as depicted in FIG. 10) laterally positioned between said knee coupling mount connecting rod 35c (e.g., such as shown in FIG. 10) and the crank connecting rod mount 17c (e.g., such as shown in FIG. 10) and also a second rocker arm 7 axially connected to the elbow joint 27 (e.g., refer to FIG. 10) at the first end of the second rocker arm 7 and axially mounted to frame 3 by a second rocker arm axle 11 (e.g., refer to FIG. 10) at a second rocker arm end, and a crank 13 axially mounted to the frame 3 by crank shaft 15 (e.g., refer to FIG. 10 for corresponding shaft) which, in turn, is operatively connected to locomoting means (generally referenced as 29 in the Figures) provides power to crank 13. A crank pin 17 of crank 13 is axially connected to connecting rod mount 17c (e.g., again refer to FIG. 10) at a distal connecting rod end or power input end of connecting rod 21.

Chair 90 is integrated into the frame 3 structure so as to provide seating for an occupant. Chair 90 is equipped with a backrest 92, seat 94, armrests 96 and a foot rest 98 with joystick 29j and its associated control box 29b being conveniently mounted to the right side armrest 96.

The side-elevational view of FIG. 19 shows in greater detail the cooperative relationship between walking assemblies 1C and 1D. The remaining components as designated in FIGS. 18 and 19 bear a corresponding relationship to those component parts as disclosed in FIGS. 1–16 with the exception of the particular placement of the walking assemblies 1A, 1B, 1C, and 1D. The walking device 10 has a particular advantage over the wheeled wheelchairs in that the walking chair device 10, as illustrated in FIGS. 18 and 19, has a unique ability to effectively traverse vertical obstructions such as curbs, steps, etc. The walking device 10 effectively traverses unprepared, tough, obstructed and uneven surfaces, thus, substantially increasing the range of locations inaccessible to conventional wheelchairs.

The walking device 1 of this invention uniquely allows frame 3 and foot 33 to traverse the ground in a substantially parallel elevational relationship. Similar to an automobile with wheels traversing the surface in which the axles remain in parallel alignment to the surface being traversed by the vehicle, the walking device 1 of this invention permits the frame 3 to maintain its parallel relationship to the ground as it traverses the ground. This is basically accomplished by the cooperative arrangement of the working components which transform motion into a curvilinear and substantially linear orbital pathway of the grounded foot 33 as provided by this walking device 1. When the foot 33 is in the grounded forward stride position, foot 33 moves backwardly in a substantially linear path so that the frame will maintain its substantially parallel relationship to the ground while foot 31 traverses to the ground from the beginning of its stride to the ending of the stride. Upon completion of the stride, the foot 33 transforms the orbital and reciprocating motion into a curvilinear pathway so that the foot 33 may be appropriately lifted to the stepping height. The step height of the gait may be varied by the selection of the various points which are utilized for the various axial points and linkages for the walking device 1. The walking device 1 as depicted in FIGS. 1–16 are designed so as to have a maximum step height amounting to 0.5424 or 54.24% of its stride length. In other words, the foot 33 is lifted slightly more than ½ of the stride length. This allows the leg 33 and device 1 to clear obstacles which may be approximately 54% of the stride length. The stride elevation and stride length may be altered by modifying the cooperative arrangement of the stride regulating features of the invention. For faster moving devices 1, a lower stride elevation than depicted facilitates operational speed of the device 1.

The walking device 1 of this invention may be utilized in any machine adapted to traverse over ground surfaces. The walking device 1 may be, accordingly, utilized in those applications conventionally relying upon wheels or tracks. The walking device 1 of this invention has definitive advantages over wheeled and tracked devices in that similar to the legs of animals, it possesses an ability to step over obstacles (e.g. steps, curbs, mud, snow, sand, etc.) rather than rolling through or around obstacles. Consequently, the walking device 1 is capable of traversing terrains in which conventional tracked or wheeled objects could not traverse or would be difficult to traverse. Unlike wheeled devices, there exist no rolling friction between legs 31 and the surface. Unlike wheeled and tracked devices, the walking device 1 of this invention does not leave a continuous track or pathway, but rather similar to legged animals, it leaves footprints. Unlike conventional wheeled or tracked devices, the present device 1 can be adapted to effectively navigate steps and stairs. Also, similar to animal tracking, the walking device 1 of this invention is capable of doing less damage to the terrain than wheeled or tracked vehicles. It is also capable of undergoing delicate or tight maneuvers which cannot be effectively accomplished with wheeled or tracked vehicles.

Illustrative uses for the present walking device 1 include manned and unmanned vehicles. As previously mentioned, the legged vehicles may be motorized or manually powered. Exemplary adaptations of the present walking device 1 include those presently provided by motorized transporting vehicles for family, industrial, agriculture and recreational purposes; human powered vehicles and cycles; wheelchairs; autonomous vehicles; remote-controlled vehicles; all-terrain vehicles; walking devices for disabled animals such as paraplegics, bicycles, tricycles; legged replacements for wheeled and tracked toys; imitation or toy animals; animated cartoon characters; mobile units and the like.

The length between the axial mounts of the various components of the walking device 1 and their respective spatial relationship have a direct bearing upon the orbital movement of the foot 33 or stride of walking device 1. As typified by the single legged walking device shown in FIGS. 1–10, if it is desired to create a walking device 1 having a grounded stride measuring one unit (e.g. such a unit may be in any unit size such as inches, foot, yards, meters, etc.) and a vertical stride lift (elevation) of 0.5424 unit (i.e. of stride length), the following unit distances between the axle mounts and positioning of axle mounts may be used to construct such a walking device 1. The distances between the respective axle sites and axle positioning have a direct bearing upon the orbital movement of the foot. Similarly, by increasing the dimensional size of the components the orbital movement of foot 33 will correspondly increase. In constructing such a device, the frame may be suitably constructed of a triangular frame for supporting axle frame mounts 11m, 9m and 15m having a leg side (front) measuring 0.8017 unit from the center point of second rocker arm mount 11m to first rocker arm mount 9m, a rear triangle side measuring 0.5848 unit from the center of first rocker arm bushing mount 9m to crank axle mount 15m and a base triangle side (bottom) measurement between the rocker arm bushing mount 11m and crank axle bushing mount 15m of 0.6168 unit. A leg measuring approximately two units bent at the knee so as to form 150° angular bend (as measured from the rear of the bent leg) may be effectively utilized in constructing a suitable leg for the walking device 1 as shown in FIGS. 1–10. The distance measures 0.896575 unit length between its axial knee mount 35m to its axial connection to hip joint mount 37m of leg 31. The distance from the base of foot 33 to hip joint mount 37m measures 1.7320 (straight lineal) units. The axial centering points between first rocker mount 9c to the hip mount 37c of the first rocker arm 5 measures 0.517638 units. The distance between the knee 35 coordinate to the center point of foot 33 measures 0.8966 units. The distance between the axial center of crank rod connection 17c to elbow connecting site 27c center measures 0.3236 units. In the second rocker, the centering distance between elbow connecting site 27c and the second rocker mount 11c measures 0.32357 units. The centering distance between crank rod connecting mount 17c of connecting rod 21 and knee coupling mount 35c of connecting rod 21 measures 1.0991 units. The centering distance between the crank connecting mount 17m and crank shaft 15 mount measures 0.267949 units. The centering distance between axial knee mount 35m to elbow joint 27c measures 0.510412 units.

When mounting the walking device 1 as depicted in the figures, the distance between frame 3 and the surface of a fully grounded foot 33 should be sufficient so as to provide a positioning of the linkages so as to optimize the linear pathway of the foot 33. This may be accomplished in the above dimensionally described device 1 by positioning the second rocker arm axle mount 11m at an elevation of 0.7106 units above the pathway and the crank axle bushing mount 15m at an elevation of 0.8920 units above the pathway.

The walking device 1 having the characteristics as defined in immediately above paragraphs when, as described above, are assembled together as shown in FIGS. 1–10 will provide a single legged walking unit 1 having grounded a stride measuring one unit and an inherent ability to lift the foot upwardly and forwardly 0.5424 unit at its highest elevational point, which point occurs at approximately a 284° rotational position of the crank rod 17. As commonly understood, these units may be given any prescribed value such as in inches, feet, meters, etc. so long as they bear the unitary relationship as mentioned herein. Thus, the walking device 1 having the aforementioned dimensional and positional alignments will have the walking characteristics as defined immediately above.

The unitary sized links and their respective planar geometric placement in providing walking device 1 may be computed mathematically or by the plotting from geometric configurations. FIG. 17 illustrates a geometric representation for plotting or determining suitable axial coordinates for constructing the walking device 1.

In the geometric determination, the length of the stride is selected as one unit and is represented by a horizontal line segment or chord 50s. The left endpoint 33x of this line segment 50s represents the foot 33 when the device 1 is fully extended in the grounded stride position as shown in FIG. 1. The other endpoint 33y represents the foot 33 at the end of the grounded gaited position as shown in FIG. 3. A line 51n is drawn perpendicular to and centered on line 50s to provide a bisecting perpendicular line 51n. Point 52p is located on this line (FIG. 17 shows 52p being 0.8660 units above 50s). For a different unit and foot pattern point 52p may be repositioned along line 51n. A circle 53c centered at 52p is then drawn. The radius of the circle 53c is greater than one-half the stride length. As may be measured, circle 53c in FIG. 17 has a radius of one unit. Point 62p is located at the radian intersection of line 51n and circle 53c. A vertical line 54s perpendicular to line 50s is drawn from point 33x. Another perpendicular line 55s to line 50s is drawn from point 33y. The intersections of parallel lines 54s and 55s and the upper half of circle 53c form points 56p and 57p respectively.

Point 9 may be positioned on circle 53c to the right of 55s or to the left of 54s. For illustrative purposes, point 9 is shown as being located on radian 53c of circle 53c 60° to the right of vertical intercept of line 51n on circle 53c in FIG. 17. Point 9 represents a suitable mounting position for axle mount 9m of upper rocker arm 5 to frame 3. Three lines are drawn from point 9 to points 56p, 62p and 57p which are labeled 58s, 59s and 60s respectively. Line 61s is drawn from point 33x to point 62p. The angle 63a between line 51n and line 61s as shown in FIG. 17 is measured. A line 64s is drawn from point 62p so that angle 63a is recreated as 63a' between 64s and 59s. Point 37x is located at the intersection of lines 64s and 58s. Point 37y is located on line 60s the same distance from point 9 as the distance between point 37x and point 9 (points 37y and 57p coincide in FIG. 17).

Point 65p is located on the lower portion of circle 53c (FIG. 17 shows point 65p directly beneath point 52p). Three lines are drawn from 65p to points 56p, 62p and 57p, which lines are labeled 66s, 67s and 68s respectively. It should be noted that lines 51n and 67s coincide in FIG. 17. A line 69s is drawn from point 62p so that angle 63a is recreated as 63a" between 69s and 67s (note lines 69s and 61s also coincide in FIG. 17). Point 35x is located at the intersection of lines 66s and 69s. Point 35y is located on line 68s the same distance from point 65p as the distance between points 35x and 65p.

A line 70s is then drawn from point 35x to point 35y. The intersection of line 70s and 67s form point 71p (points 71p and 52p coincide in FIG. 17). Point 72p is located on line 67s the same distance from point 65p as the distance between points 35x and 65p. A lines 73s is drawn perpendicular to line 67s midway between points 71p and 72p. Point 74p is located at the intersection of lines 67s and 73s. Point 75p is located on line 73s (the distance between points 74p and 75p in FIG. 17 is 1.0986 units).

A line segment 76s with the length of one-quarter of the length of line 70s is then drawn perpendicular to line 73s and on the downward side of 73s at point 75p. The end point of line 76s opposite point 75p is labeled point 15 which identifies the axle location or crank shaft mount 15m on frame 3 for crank shaft 15. A line segment 77s having the same length as line 76s is then drawn perpendicular to line 73s at point 75p on the upward side of line 73s. The endpoint of line 77s opposite point 75p is labeled 78p. A line 79s is then drawn parallel to line 73s that passes through point 15. Point 29y is located on line 79s on the opposite side of line 76s as line 67s which is at a distance from point 15 equal to one-half the length of line segment 70s. Point 29x is located on line 79s on the opposite side of point 15 as point 29y at a distance from point 15 equal to one-half the length of line segment 70s.

Point 27x is located on line 79s (FIG. 17 uses a distance of 0.5895 units between points 29x and 27x). Point 27y is located on line 79s the same distance from point 29y as the distance between points 27x and 29x. Point 80p is located at a point that is the same distance from point 72p as the distance between points 35x and 27x, and the same distance from point 78p as the distance between points 27x and 29x. A line 81s is drawn from point 27x to point 80p. A line 82s is drawn from point 80p to point 27y. A line 83s is drawn perpendicular to line 81s midway between points 27x and 80p. A line 84s is then drawn perpendicular to 82s midway between points 80p and 27y. The intersection of lines 83s and 84s at point 11 identifies the location of the second rocker arm axle mount 11m to frame 3.

The geometric depiction of FIG. 17 also identifies the placement and orbital pathway of crank rod or pin 17 (shown as power source 29) in the fully extended position 29x or retracted ground stride position 29y, the knee joint 35 in the extended 35x and retracted position 35y, the extended hip joint 37x and retracted hip joint 37y and the elbow joint 27 as extended 27x and retracted 27y. Measurements for the appropriate linkages may be measured from the appropriate linking points of FIG. 17.

The following Table 1 sets forth the coordinates for the points shown in FIG. 17:

TABLE 1

|     | X     | Y      |
|-----|-------|--------|
| 9   | 1.366 | 1.366  |
| 11  | 1.009 | 0.574  |
| 15  | 1.599 | 0.750  |
| 27X | 0.741 | 0.750  |
| 27Y | 1.277 | 0.750  |
| 29x | 1.331 | 0.750  |
| 29y | 1.867 | 0.750  |
| 33x | 0.000 | 0.000  |
| 33y | 1.000 | 0.000  |
| 35x | 0.232 | 0.866  |
| 35y | 0.768 | 0.866  |
| 37x | 0.866 | 1.500  |
| 37y | 1.000 | 1.732  |
| 52p | 0.500 | 0.866  |
| 56p | 0.000 | 1.732  |
| 57p | 1.000 | 1.732  |
| 62p | 0.500 | 1.866  |
| 65p | 0.500 | -0.134 |
| 72p | 0.500 | 0.901  |
| 78p | 1.599 | 1.018  |
| 80P | 1.022 | 0.894  |

As evident from the aforementioned, the positioning of 52p (center point) may be adjusted upwardly or downwardly along line 51n which, in turn, will alter the placement of the coordinates of FIG. 17. FIG. 17 shows how the device 1 having the particular characteristics as defined in a preferred embodiment of the invention may be constructed. By changing the configuration of the stride and its placement, a completely different set of suitable coordinates may be derived using the determined methodology as described above. The dimensions and positional placement for the pivotal coordinates of device 1 may also be calculated from Table 1 by using the Pythagorean Theorem.

In the walking chair device 1 as depicted in FIGS. 18 and 19, it is desirable to design the linkages to permit device 1 to step onto the curb while still maintaining a profile low enough to clear seat 94. The step height for the walking chair 1, as shown in FIGS. 18 and 19 is set at 7.5 inches, the stride length at 12 inches and the deviation from linear of +/-0.33 inches.

The linkages, as shown in FIGS. 18 and 19, are proportioned differently than those of FIGS. 1–16 as described in Table 1. The four sets of legs (1A, 1B, 1C and 1D) on the walking chair 1, as shown in FIGS. 18 and 19, are dimensioned in inches using a standard Cartesian coordinate system with location 33x as the origin as tabulated in Table 2. The rear two sets of legs 1B and 1D are shown in a forward motion position with the extended foot as the most rearward point. The rear two sets of legs (1B and 1D) swivel about a vertical axis which is in alignment with the second rocker arm axle 11. The distance between locations 33x on the front and rear sets of legs in FIGS. 18 and 19 is set at 60 inches so as to provide a balanced stability regardless of the direction of travel.

The walking device chair 1 linkages may be defined using the coordinates of Table 2 which tabulates the pivot points for the FIGS. 18 and 19 walking chair 1:

TABLE 2

|     | X      | Y      |
|-----|--------|--------|
| 9   | 17.818 | 16.076 |
| 11  | 12.101 | 10.186 |
| 15  | 17.607 | 11.807 |
| 27X | 9.125  | 11.807 |
| 27Y | 15.077 | 11.807 |
| 29X | 14.631 | 11.807 |
| 29Y | 20.583 | 11.807 |
| 33x | 0.000  | 0.000  |
| 33y | 12.000 | 0.000  |
| 35x | 3.024  | 13.099 |
| 35y | 8.976  | 13.099 |
| 37x | 11.119 | 19.200 |
| 37y | 13.578 | 22.130 |
| 52p | 6.000  | 13.992 |
| 56p | 0.000  | 24.384 |
| 57p | 12.000 | 24.384 |
| 62p | 6.000  | 25.992 |
| 65p | 6.000  | 1.992  |
| 72p | 6.000  | 13.491 |
| 78p | 17.607 | 14.783 |
| 80P | 12.236 | 13.572 |

In the figures depicting the walking device, the various component parts are enumerated with a corresponding number in each of the figures so as to provide consistency in the depicted components from one walling device to another. In certain of the figures, such as in FIGS. 10–11, 14–16 and 18–19 similar components have enumerated the same but with different alphabetical indexing in order to explain in more detail how similar component parts relate to one another in the walking device.

What is claimed is:

1. A walking chair device equipped to carry an operating occupant and to simulate a walking step of an animal, said device comprising:

a) a frame supporting a chair equipped with a seat for seating the operating occupant, said frame having a first rocker arm mount, a second rocker arm mount and a crank mount positioned upon the frame in a predetermined spaced relationship so as to regulate movement of the walking step:

b) a leg having a foot at one leg end, a centrally disposed knee joint and a hip joint at an opposite leg end from said foot;

c) a first rocker arm axially connected at one rocker arm end to the hip joint and axially mounted to the first rocker arm mount at an opposite rocker arm end;

d) a connecting arm having a knee coupling mount at a distal connecting arm end for operationally connecting the connecting arm to the knee joint, a crank rod connecting site at a proximate end of the connecting arm and an elbow joint connecting site positioned between said knee coupling mount and said;

e) a second rocker arm axially coupled to the elbow joint connection site at a first end of the second rocker arm and axially mounted to the second rocker arm mount at a second end; and f) a crank axially mounted to the crank mount for revolutionary motion about the crank mount at one crank end and operationally connected to a crank rod at the crank rod connecting site at an opposing crank end of the crank for locomoting the connecting arm; wherein said first rocker arm and said second rocker arm upon the revolutionary motion of the crank cooperatively serve to limit the walking step of the leg to a reciprocating arcual motion as the knee joint is driven by said connecting arm.

2. The walking chair device according to claim 1 wherein the device includes a plurality of legs operatively driven by a number of connecting rods powered by a multiplicity of cranks driven at variable rotational speeds.

3. The walking chair device according to claim 2, wherein the walking chair device includes at least six legs paired together as a pair of legs disposed in a lateral relationship with each said pair of legs being driven by crank rods positioned at a 180° angular differential from one another.

4. The walking chair device according to claim 3, wherein said pairs of legs comprise four pairs of legs driven by the crank rods and powered by variable speed motors and controlled by a control box for turning the crank rods at different rotational speeds for each of said pairs.

5. A method for traversing a surface with a walking chair device which simulates a walking step of an animal, said device comprising a frame supporting a chair equipped with a seat for seating an operating occupant, said frame having a first rocker arm mount, a second rocker arm mount and a crank mount positioned upon the frame in a predetermined spaced relationship so as to regulate movement of the walking step; a leg having a foot at one end, a centrally disposed knee joint and a hip joint at an opposite leg end from said foot; a first rocker arm axially connected at one rocker arm end to the hip joint and axially mounted to the first rocker arm mount at an opposite rocker arm end; a crank axially mounted to the crank mount at one end and equipped with a crank rod at an opposite crank end; a connecting arm for providing a reciprocating motion to the leg with said connecting arm being axially connected to the crank rod at a proximate end of the connecting arm and having a knee coupling mount at a distal connecting arm end axially connected to the knee joint; a crank connecting rod mount at a proximate end of the connecting arm and an elbow joint connecting site disposed between said knee coupling mount and said said crank rod; a second rocker arm axially coupled to the elbow joint connecting site at a first end of the second rocker arm and axially mounted to the second rocker arm mount at a second end; and locomoting means for rotationally turning the crank, wherein the walking chair device includes a plurality of legs and multiple respective connecting arms and cranks each equipped with variable speed locomoting means for turning the cranks and a control box for operationally controlling the rotational speeds of the cranks, said method comprising:

a) placing the walking chair device upon the surface in a walking position; and b) seating of the occupant upon the seat and navigating the device by said occupant by manipulating said control box so as to engage the locomoting means so as to rotationally move the cranks about an orbital axis causing each respective connecting arm to drive each respective leg in a reciprocating arcual motion of a limited horizontal and vertical movement and thereby enable the walking chair device to traverse the surface.

* * * * *